United States Patent [19]
Ichiyanagi et al.

[11] Patent Number: 4,584,915
[45] Date of Patent: Apr. 29, 1986

[54] CONTROL SYSTEM FOR A CAM FOLLOWER AND TOOL

[75] Inventors: Takashi Ichiyanagi, Hirakata; Kiyokazu Imanishi, Higashi Osaka, both of Japan

[73] Assignee: Matsushita Electric Industrial Co., Ltd., Osaka, Japan

[21] Appl. No.: 719,043

[22] PCT Filed: Dec. 9, 1981

[86] PCT No.: PCT/JP81/00375
§ 371 Date: Aug. 5, 1982
§ 102(e) Date: Aug. 5, 1982

[87] PCT Pub. No.: WO82/02016
PCT Pub. Date: Jun. 24, 1982

Related U.S. Application Data

[63] Continuation of Ser. No. 405,952, Aug. 5, 1982, abandoned.

[30] Foreign Application Priority Data

Dec. 11, 1980 [JP] Japan ............................ 55-175535
Jan. 16, 1981 [JP] Japan ............................ 56-5278

[51] Int. Cl.[4] .............................................. B23B 3/28
[52] U.S. Cl. .................................. 82/19; 82/2 B; 82/21 B; 318/578; 364/474; 409/127
[58] Field of Search .............. 82/19, 2 B, 21 B, 24 R; 318/578; 364/520, 474; 74/55; 409/127

[56] References Cited

U.S. PATENT DOCUMENTS

| 1,500,637 | 7/1924 | Pillar | 82/19 |
| 2,228,902 | 1/1941 | Allen | 318/578 |
| 3,680,415 | 8/1972 | Takano et al. | 82/19 |
| 3,744,125 | 7/1973 | Schalles | 82/2.7 |
| 3,746,955 | 7/1973 | Kobayashi | 82/2 B |
| 3,753,384 | 8/1973 | Anfindsen | 82/24 R |
| 3,798,721 | 3/1974 | Schalles | 82/36 A |
| 3,851,550 | 12/1974 | Schalles | 82/21 B |
| 3,967,515 | 7/1976 | Nachtigal et al. | 82/2 B |
| 3,983,770 | 10/1976 | Skrentner et al. | 82/19 |
| 4,203,062 | 5/1980 | Bathen | 82/21 B |

FOREIGN PATENT DOCUMENTS 50-145986 11/1975 Japan .
53-13275 2/1978 Japan .
53-34200 3/1978 Japan .

Primary Examiner—Francis S. Husar
Assistant Examiner—Jerry Kearns
Attorney, Agent, or Firm—Wenderoth, Lind & Ponack

[57] ABSTRACT

A device imparts a predetermined motion to an object by using a cam. The device comprises a load compensator disposed at any desired position in a driven section and adapted to apply a force or torque to the driven section in order to counterbalance variations in the force of contact between a cam and a cam follower. The variations are caused by the movement of the driven section. The force of contact is maintained at a constant value, and enables the achievement of stabilized high-precision motion of the cam driven system, particularly the achievement of high-precision high-speed machining of the lead on a VTR lower cylinder by using an end cam.

5 Claims, 9 Drawing Figures

CONTROL SYSTEM FOR A CAM FOLLOWER AND TOOL

This application is a continuation of now abandoned application Ser. No. 405,952, filed Aug. 5, 1982.

BACKGROUND OF THE INVENTION

1. Technical Field of the Invention

The present invention relates to a device for imparting a predetermined motion to an object by using a cam, and provides a cam driving device adapted to reduce variations in the force of contact between the cam and a cam follower which variations are caused by the motion of a driven section, so as to achieve high-speed high-precision motion.

2. Description of the Prior Art

Conventional cam driving devices, particularly a cam device for machining (video tape recording) cylinders which demand precision, will now be described.

Figure 1:
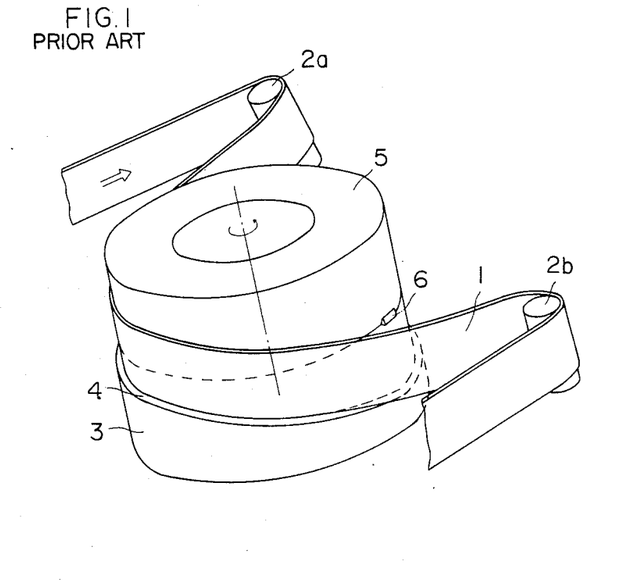
FIG. 1 is a perspective view of a VTR cylinder tape guide section.

FIG. 1 shows a typical VTR cylinder section, wherein a tape 1 is entrained around the outer peripheral surfaces of an upper rotary cylinder 5 and a lower fixed cylinder 3 in such a manner that the edge of the tape 1 extends along a tape guide 4 (hereinafter referred to as a lead) provided on the outer peripheral surface of the lower fixed cylinder 3, said tape 1 traveling at a fixed speed. A magnetic head 6 is attached to the upper rotary cylinder 5 to move diagonally of the tape 1 during rotation of said upper rotary cylinder 5 and serves to record and reproduce magnetic signals on the tape or to reproduce magnetic signals previously recorded on the tape.

If, therefore, the tape guide 4 comprising the outer peripheral surfaces of the upper and lower cylinders 5 and 3 and the lead 4 provided on the lower cylinder 3 is not correctly produced and assembled, this would result in unstable contact between the tape 1 and the magnetic head 6, causing unevenness in reproduced images in the VTR.

For example, lack of true circularity in the cylinders 3 and 5 varies the state of contact between the magnetic head 6 and the tape 1, while lack of linearity in the lead 4 wrinkles the tape 1, each causing trouble in reproducing images.

Figure 2:
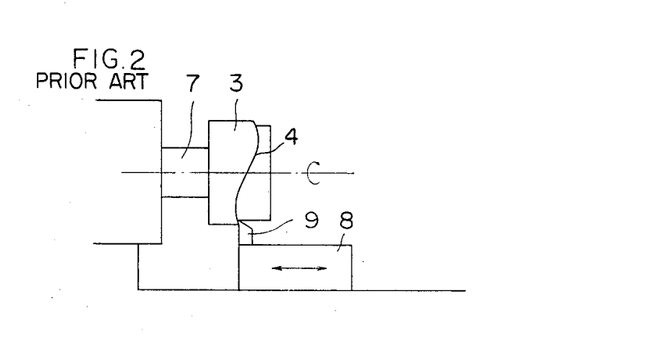
FIG. 2 is a sectional view of a prior art device for machining a VTR lower cylinder.

The lead 4 on the lower cylinder 3 is generally produced on a lathe, as shown in FIG. 2. More particularly, a cutting tool 9 fixed to the tool rest 8 is reciprocated in the direction on arrows in synchronism with the rotation of the lathe main spindle 7 to produce a predetermined shape. Thus, changes in the position of the tool rest 8 in reciprocating motion must agree with the shape of the lead 4.

Figure 3:
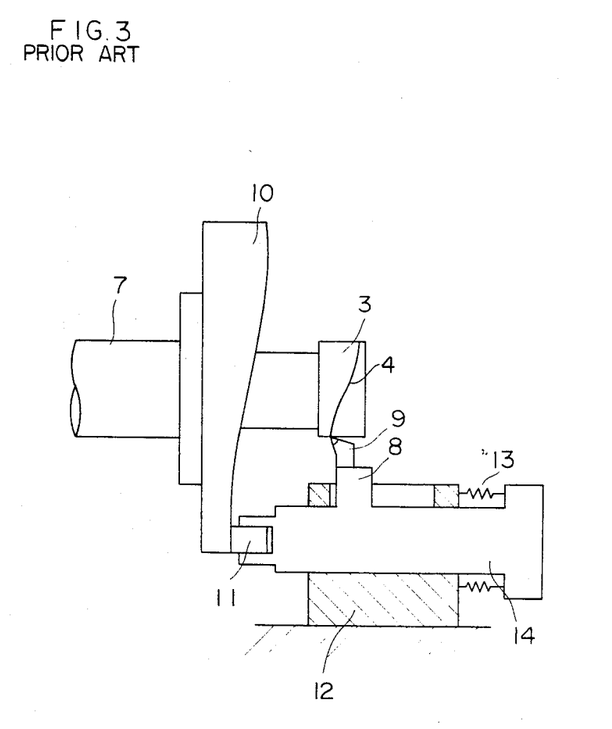
FIG. 3 is a sectional view of a conventional lead machining cam device.

Conventionally, the method most widely practiced for giving the tool rest 8 a motion agreeing with a predetermined lead shape has, as shown in FIG. 3, been to attach to the main spindle 7 of the lathe an end cam 10 having a curve similar to the shape of the lead 4 drive the tool rest 8 as a function of the curve of the end cam 10. The numeral 12 denotes a guide for the reciprocating linear motion of the tool rest 8, and 13 denotes a spring interposed between the guide 12 and a reciprocating rod 14 for urging a cam follower 11 against the end cam 10.

In addition, though not shown in FIG. 3, the reciprocating rod 14 is internally provided with a mechanism for feeding the cutting tool 9 during lead machining. Phenomena which take place during the machining of the lead 4 by using the end cam 10 described above are as follows.

(1) With changes in the position of the reciprocating rod 14, the amount of deflection of the spring 13 changes and so does the force of contact between the surface of end cam 10 and the cam follower 11.

(2) The inertia effect of the reciprocating rod 14 due to its reciprocating motion varies the force of contact between the surface of end cam 10 and the cam follower 11, and in the case of high-speed motion, the cam follower 11 jumps off the cam surface.

(3) Vibration of the entire machining system takes place with the reciprocating motion of the reciprocating rod 14.

These phenomena produce serious influences on the machining of the lead 4 which requires a high accuracy of the order of microns. More particularly, variations in the force of contact between the cam surface and the cam follower 11, i.e., the force on the end cam 10, not to speak of the phenomenon of the cam follower 11 jumping off the cam surface, aggravate the accuracy of rotation of the main spindle 7, producing a decisive influence on the true circularity of the cylinder 3. Further, vibration of the machining system must be avoided as much as possible.

With the conventional cam driving device, which has the drawbacks described above, it has been very difficult to achieve high speed machining while maintaining high accuracy.

SUMMARY OF THE INVENTION

The present invention relates to a device for imparting a predetermined motion to an object by using a cam, comprising a load compensation actuator disposed at any desired position in a driven section. The actuator is adapted to apply a force or torque to said driven section in such a manner as to counterbalance variations in the force of contact between the end cam 10 and the cam follower 11 caused by variations in the inertia force of the driven section due to its movement or caused by variations in the load on the point of action, i.e. the cutting edge of the tool 9. The force of contact at a costant value to enable the achievement of stabilized high-precision motion even during high speed operation. Particularly, the invention makes it possible to machine work with high precision as in the case of machining a lead 4 on the VTR lower cylinder 3 by using an end cam 10.

DETAILED DESCRIPTION OF THE PREFERRED EMBODIMENTS

Embodiments of the invention will now be described with reference to the drawing figures.

Figure 4:
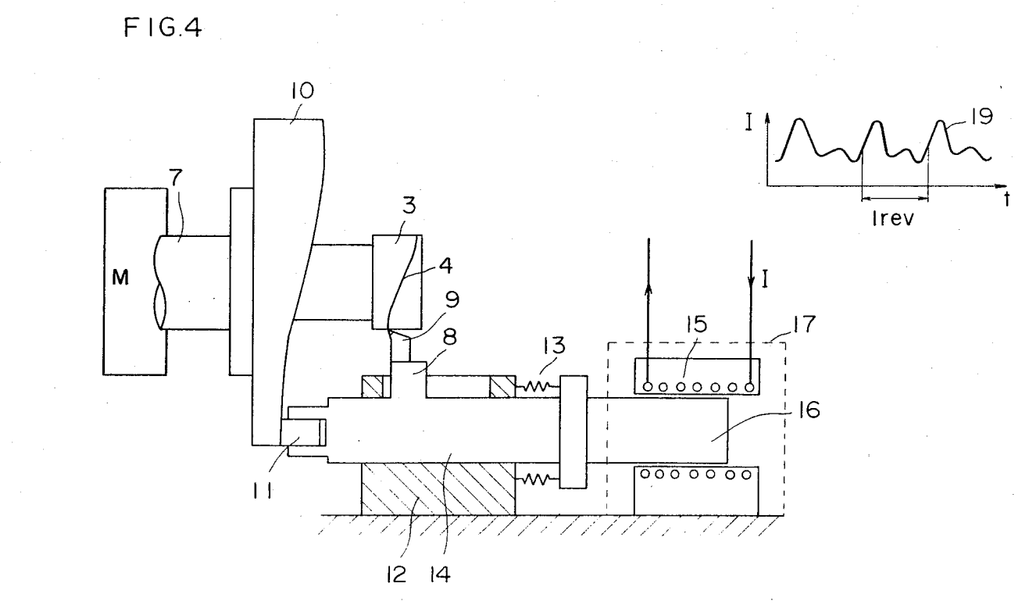
FIG. 4 is a sectional view of a lead machining cam device according to a first preferred embodiment of the present invention.

FIG. 4 shows a first embodiment of a lead machining cam device according to the invention.

Motor M rotates and supports the cam 10 through the main spindle 7. Disposed at the rear end of the reciprocating 14, there is a load compensation actuator 17 comprising a plunger driven by an electromagnet. The numeral 15 denotes a solenoid electromagnet, and 16 denotes a plunger connected directly to the rear end of the reciprocating rod 14. A current I to be fed to the solenoid electromagnet 15 has a preset waveform (shown as 19) with one period being taken as the time required for the main spindle to make one complete revolution. The current waveform 19 is determined on the following principle.

Figure 5:
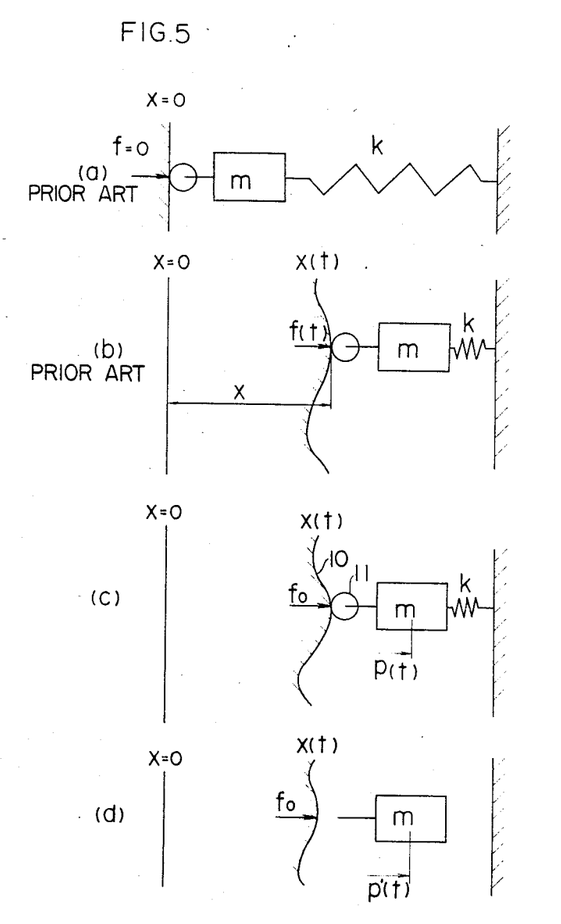
FIG. 5 is a diagram illustrating an analysis of the motion of a cam device in the prior art versus in the present invention.

FIG. 5 (a) and (b) illustrates the principle of a conventional lead machining cam device. Mass m is the mass of the driven section, i.e., the sum of the masses of the reciprocating rod 14, tool rest 8, cutting tool 9, cam follower 11 and other objects which reciprocate. FIG. 5 (a) shows a spring in its natural state with no force applied thereto, or shows its free length, the position of the cam follower 11 at this instant being x=0. FIG. 5 (b) shows a state during lead machining, the equation of motion in this case being given by equation (1) below. But the cutting force on the cutting tool a (the load on the point of action) is neglected.

$$m\ddot{x} + kx = f(t) \quad (1)$$

where f(t) is the force of contact between the cam follower 11 and the surface of the end cam 10, which can be found by x(t), i.e., the positional curve determined by the shape of the lead 4. To allow the cam follower 11 to correctly follow the surface of the end cam 10, f(t) must always be positive. As an example, suppose that the shape of the lead 4 is a sine curve. Then, x(t) is expressed by equation (2).

$$x(t) = \underline{a} \sin\left(\frac{2\pi N}{60} t\right) + x_0 \quad (2)$$

(where a is the amplitude of the sine curve; N is the rpm of the main spindle 7; and $x_0$ is the initial deflection of the spring 13.) From equations (1) and (2), f(t) is written as follows.

$$f(t) = -\underline{a} \left| m\left(\frac{2\pi N}{60}\right)^2 - k \right| \sin\left(\frac{2\pi N}{60} t\right) + kx_0 \quad (3)$$

Figure 6:
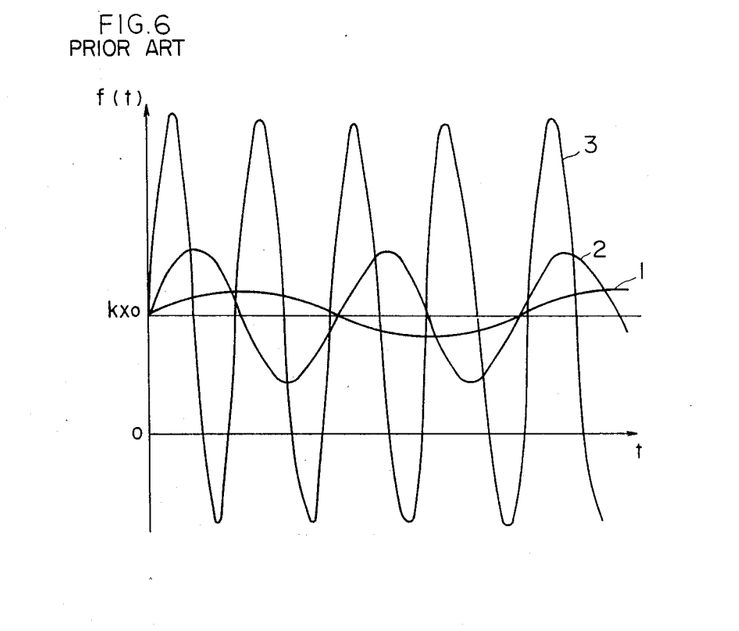
FIG. 6 is a diagram illustrating an analysis of a force on a cam exerted by a cam follower in a conventional cam device.

What is meant by this equation is illustrated in FIG. 6. The curves 1, 2 and 3 in the graph respectively show the contact forces f(t) between a cam 10 and a follower 11 required for the follower 11 to follow the cam 10, as the speed of operation of the cam 10 continues increasing. That is, as the rpm is increased, the range of variations in the force on the cam 10 widens and eventually the cam follower 11 fails to follow the cam 10, jumping off the latter. In the actual curve of the lead 4, the conditions are more involved. For example, the shape of the lead 4 may be straight where it is contacted by the tape 1; but the basic tendency of the cam follower 11 to jump off the cam 10 is the same.

Now, the principle of the invention is as illustrated in FIG. 5 (c). Let P(t) be the force on the reciprocating rod 14 exerted by the plunger 16. Then, motion for the system is expressed by the following equation.

$$m\ddot{x} + kx = p(t) + f_0 \quad (4)$$

where $f_0$ is the optimum force of contact between the cam follower 11 and the surface of the cam 10. P(t) is set so that $f_0$ is constant.

Thus, the force P(t) to be applied to the reciprocating rod 14 by the plunger 16 is as follows.

$$p(t) = m\ddot{x} + kx - f_0 \quad (5)$$

Further, the current I to be applied to the solenoid electromagnet 15 may be calculated from the current-force characteristics of the plunger 16.

If the motion of the cam 10 or variations in the load on the cutting point of action tool 9 are too complicated to theoretically derive P(t), then f(t) may be experimentally determined in order to find P(t).

In brief, the invention resides in a device having an end cam 10, wherein a load compensation actuator 17 is disposed at any desired position around a driven section, i.e. the plunger 16. The actuator 17 is adapted to apply to the driven plunger 16 a force or torque preset in such a manner as to counterbalance variations in the force of contact between the cam 10 and the cam follower 11. These variations are caused by variations in the inertia force of the driven plunger 16 due to its movement or by variations in the load on the cutting point of tool 9. Thus, the actuator 17 maintains the force of contact between the cam 10 and cam follower 11 at a constant value to provide a stabilized operation.

In addition, in FIG. 5 (c), a spring element k is provided for pressing the cam follower 11 against the cam 10, but if variations in the pressing force produced by deformation of the spring element k are large, the spring element k may be replaced by some other element which produces a constant force irrespective of displacement, e.g., a pneumatic cylinder, in which case the spring constant is nearly equal to 0, so that the term kx can be neglected, a fact which is effective.

Further, these elements for producing the pressing force may be replaced by the actuator 17 of the load compensator, and the output P'(t) from the actuator 17 is as follows.

$$p'(t) = m\ddot{x} - f_0 \quad (6)$$

A comparison with equation (5) shows that this arrangement has the advantage of eliminating the need to take into consideration the variations in the force due to the deflection of the spring element k and also has the advantage of simplifying the invention.

Figure 7:
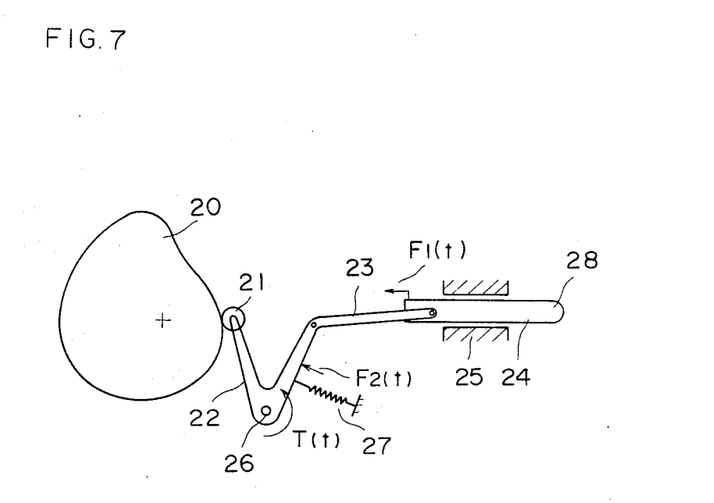
FIG. 7 is a sectional view of a second preferred embodiment of the invention.

While the lead machining cam device refers to a cam mechanism for simple reciprocating motion in the first embodiment of FIG. 4, a more general example is shown in the second embodiment of FIG. 7.

In FIG. 7, the numeral 20 denotes a cam; 21 denotes a cam follower; 22 denotes a lever; 23 denotes a rod; and 24 denotes a reciprocating rod guided by a linear guide 25. In this case, the load compensation actuator may be adapted to impart a force to the driven section as shown at $F_1(t)$ or $F_2(t)$ or to impart a torque around a pivot 26 of the lever 22 as shown at $T(t)$. The numeral 27 denotes a spring and 28 denotes a force actuator. Thus, the force actuator 28 may take the form, e.g., of the solenoid electromagnet 15 described above, or where a stronger force is needed, it may take the form of a pneumatic or hydraulic cylinder, using a control valve to control the pressure of the working fluid so as to provide a predetermined force. Further, the torque actuator may take the form, e.g., of a torque motor, in which case the voltage to be applied to the torque motor is controlled to impart a predetermined torque to the driven section.

Figure 8:
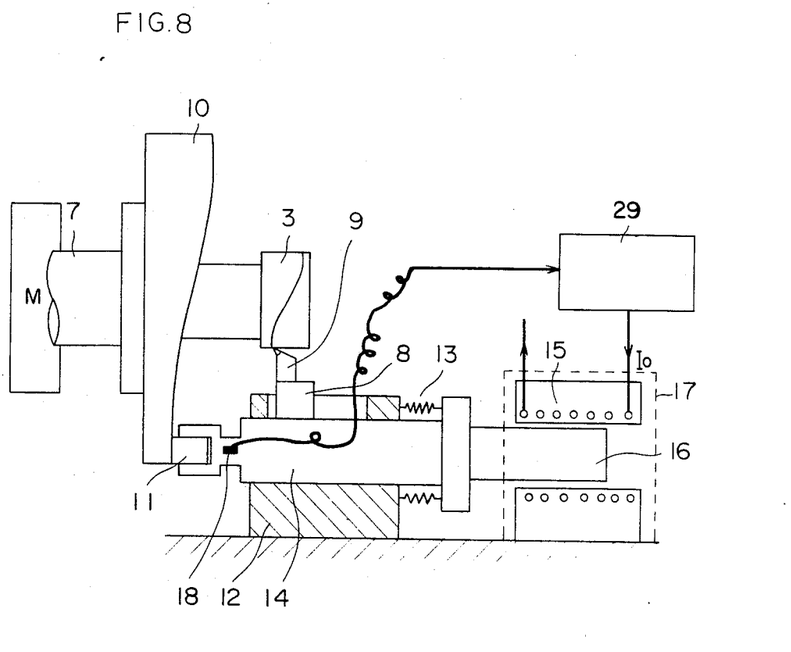
FIG. 8 is a sectional view of a lead machining cam device according to a third preferred embodiment of the invention.
Figure 9:
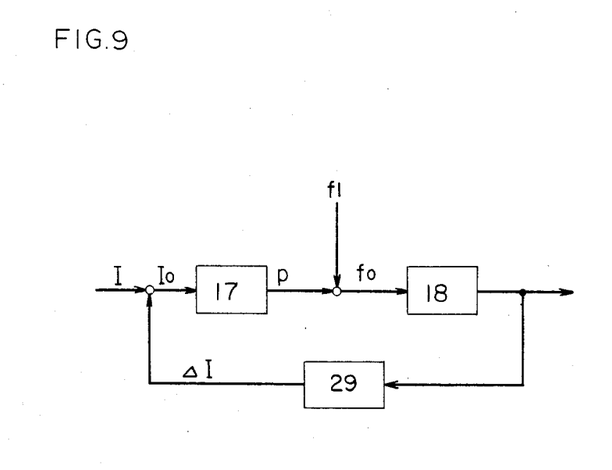
FIG. 9 is a block diagram of a control circuit for a load compensator in the third embodiment shown in FIG. 8.

The above description has assumed that the load to be applied to the driven section by the load compensation actuator is set in advance by calculation or by measurement. It is also possible, however, as shown in FIG. 8 and 9, to construct a feedback system which detects the force of contact with the cam 10 and the cam follower 11 at every moment and controls the load output from the load compensation actuator so as to counterbalance variations in the force of contact, thereby maintaining all instantaneous values of the force of contact at a fixed value. Thus, FIG. 8 shows a lead machining cam driving device according to a third embodiment of the invention, wherein a load compensating actuator 17 in the form of a plunger 16 and electromagnet 15 is disposed at the rear end of the reciprocating rod 14. The numeral 18 denotes a strain gage bonded directly to the reciprocating rod 14 for detecting axial strains in the reciprocating rod 14 so as to detect the axial load on the reciprocating rod 14, i.e., the force of contact between the cam 10 and the cam follower 11. Motor M rotates and supports the cam 10 through the main spindle 7. The numeral 29 denotes a control circuit which, using electric signals representing the detected force of contact, calculates and outputs a $I_0$ to be imparted to the solenoid electromagnet 15 in order to keep the force of contact at a constant value.

Thus, the lead machining cam device according to this third embodiment comprises the steps of using a strain gage 18 to detect variations in the force of contact between the cam 10 and the cam follower 11 caused by the movement of the reciprocating rod 14, arithmetically processing the detected signals by a control circuit 29, and applying a current $I_0$, which is an output signal from the control circuit 29, to a solenoid electromagnet 15 attached to a plunger 16 for driving the reciprocating rod 14. FIG. 9 is a block diagram of a control system for the device shown in FIG. 8.

The numeral 18 denotes a strain gage for detecting strain $\epsilon$ produced in the reciprocating rod 14 by the sum $f_0$ of the force of contact between the cam 10 and the cam follower 11, i.e., the force P from the load compensating actuator 17 and the force $f_1$ caused by the movement of the reciprocating rod 14 (in this case, $f_1$ is regarded as a disturbance to the control system). From the detected strain signal, the control circuit 29, which can be an arithmetic circuit, calculates the compensation current $\Delta I$ to be applied to the load compensator 17 to ensure that the value of $\epsilon$ at any moment is equal to a constant value $\epsilon_0$ corresponding to the optimum cam follower pressing force, i.e., preset force, and applies the current $I_0$ to the solenoid electromagnet 15 of the load compensator 17.

While the above embodiment has used a strain gage 18 for detecting the force of contact between the cam 10 and cam follower 11, it is evident that some other force detecting element, e.g., one utilizing the piezoelectric effect, may be used. Further, it is also possible to use an acceleration pickup device to detect the acceleration of the driven section in order to find variations in the force of contact caused by the inertia affect so as to effect feedback control.

The use of the lead machining cam device according to the present invention described so far is effective in eliminating or minimizing variations in the force of contact between the cam 10 and cam follower 11 caused by the movement of the reciprocating rod 14, thus enabling the achievement of stabilized high-speed operation of the cam 10, drastic reduction of machining time, and improved accuracy.

INDUSTRIAL APPLICABILITY

With the cam driving device according to the invention having a load compensating actuator 17 installed around the driven plunger 16 in order to maintain the force of contact between the cam 10 and the cam follower 11 at a constant value, high-speed high-precision motion can be achieved. If the invention is applied to a device for machining high-precision parts, such as a VTR cylinder 3, shown herein in the first and third embodiments the invention, considerable reduction of machining time and improved machining accuracy can be achieved. The invention is beneficial since it can widely be applied to cam driving devices for general machines.

We claim:

1. A control system for a cam follower and tool, comprising:
    a cam having a predetermined shape,
    means, connected to the cam, for rotating and supporting the cam,
    a cam follower for contacting said cam along said predetermined shape,
    a driven section connected to said cam follower,
    means, connected to the driven section, for driving said driven section,
    a guide means supporting said driven section,
    a detector means, operatively connected to the cam follower, for detecting the force of contact between said cam and said cam follower,
    a control circuit means, connected to the detector means, for arithmetically comparing the force of contact detected by said detector means with a preset value, and
    a load compensator means, connected to said cam follower, for loading said cam follower with a predetermined force in accordance with a signal from said control circuit means,
    whereby said force of contact becomes substantially equal to said preset value.

2. A control system for a lathe, including an end cam having a predetermined shape and being fixed to a main spindle of the lathe, motor means for rotating the main spindle and the end cam thereon, a cam follower following the shape of the end cam, a driven section connected to said cam follower, and a tool means for cutting a tape guide surface and lead, said cutting tool being fixed to said driven section, said control system being characterized by:

a detector means, operatively connected to the cam follower, for detecting the force of contact between said end cam and said cam follower, a control circuit means, connected to the detector means, for arithmetically comparing the force of contact detected by said detector means with a preset force, and a load compensator means, connected to the cam follower, for loading said driven section with a predetermined force in accordance with a signal from said control circuit means, whereby said contact force becomes substantially equal to said preset force.

3. The control system as set forth in claim 2, wherein: said load compensator means includes a plunger connected to said driven section, and a solenoid electromagnet disposed around said plunger and adapted to reciprocate the plunger by magnetic force.

4. A control system for a cam follower and tool comprising:

a cam having a predetermined shape, means, connected to the cam, for rotating and supporting the cam, a cam follower for contacting said cam along said predetermined shape, a driven section connected to said cam follower, means, connected to the driven section, for driving said driven section, a guide means for supporting said driven section, a spring means, installed between said driven section and said guide means, for urging said cam follower against said cam, and a load compensator means, connected to said cam follower, for loading said cam follower with a force P found by the following equation:

$$P = m\ddot{x} + kx - f_0$$

where P is a force loaded on the cam follower;

m is a mass of the cam follower;

$\ddot{x}$ is an acceleration of the cam follower, which acceleration is produced by the predetermined shape of the cam at any given moment as the cam follower follows the cam;

k is a spring constant;

x is a position of the cam follower at any given moment; and $f_0$ is a preset force with which the cam follower contacts the cam.

5. A control system for a lathe, including an end cam having a predetermined shape and fixed to a main spindle of the lathe, means for rotating the main spindle and the end cam, a cam follower following the shape of the end cam, a driven section connected to said cam follower, and a tool means for cutting a tape guide surface and lead, said cutting tool means being fixed to said driven section, said control system being characterized in that:

a load compensator means for loading said cam follower with a force P determined by the following equation is installed at a rear end of said cam follower:

$$p = m\ddot{x} + kx - f_0$$

wherein P is a load on the cam follower;

m is a mass of the cam follower;

x is an acceleration of the cam follower;

k is a spring constant of a spring means, installed adjacent to said driven section, for urging the cam follower against the end cam;

x is a position of the cam follower at any given moment; and $f_0$ is a preset force of contact between the end cam and the cam follower.

* * * * *